March 15, 1966 R. A. SMITH 3,240,646
METHOD FOR PRODUCING FABRIC REINFORCED
PLASTIC COATED BOWLING PINS
Filed Aug. 31, 1960

*INVENTOR.*
RICHARD A. SMITH
BY Arthur J. Plantamura
ATTORNEY.

United States Patent Office 3,240,646
Patented Mar. 15, 1966

3,240,646
METHOD FOR PRODUCING FABRIC REINFORCED PLASTIC COATED BOWLING PINS
Richard A. Smith, Cornwall on the Hudson, N.Y., assignor to American Machine & Foundry Company, a corporation of New Jersey
Filed Aug. 31, 1960, Ser. No. 53,203
5 Claims. (Cl. 156—213)

This invention relates to bowling pins and more particularly to an improved method for manufacturing of fabric reinforced plastic coated bowling pins and to the pins so produced.

In recent years, the normal life of bowling pins has been increased significantly due to advances in methods of manufacture. Due to the high and continually increasing cost of bowling pins, it is extremely desirable that the useful life of bowling pins be extended substantially to minimize replacement costs. The severe pounding to which commercially available pins in normal usage are subjected invariably effects a separation of the resinous shell (which comprises the aggregate of resinous coatings) from the wood body. Wood failure resulting from crusting of wood fiber contributes significantly to failure of the bond. This separation may occur between any of the resinous coatings applied, particularly where the coatings form more or less a clear line of demarcation between layers, a condition normally obtained in multilayer coatings. Prior art attempts have utilized various plastic formulations and/or fabric materials in efforts to improve bowling pin life. None of the methods employing fabric to provide a reinforced surface for bowling pins have been successful in preventing separation of material which is applied to the wooden body. This tendency of the coatings to delaminate from the effects of repeated blows is most pronounced at the bond between the wood and the first or prime coat. In addition to coating separation and eventual physical loss of coatings from the bowling pin surface, neck breakage due to backlash accounts for a substantial loss of bowling pins. This neck breakage is especially true with respect to bowling pins having a foamed synthetic resinous core to which the present invention is significant in providing a practically acceptable product. I have discovered that these shortcomings may be avoided by employing a reinforcing fabric embedded in an impregnant which penetrates significantly into the pores of the wood or foam base and produces a "graded" distribution of the resin in the pin cross section.

The impregnation of the core, according to the invention, may be effected prior to insertion of the pin core in the fabric sock. Preferably the bowling pin core is first inserted within the fabric sock, which has texture permitting ready penetration of the impregnant resin solution, and the pin core is then impregnated therethrough. The effect, in essence, is the penetration of the bowling pin core thereby anchoring of the resin to a substantial depth into the interstices of the fibrous structure of the wood or of the porous foam structure. An increasing resin concentration builds up towards the surface of the pin core continuing to a solid plastic coating over the surface with the reinforcing fabric embedded therein. Once the impregnant has been anchored to a suitable extent in the bowling pin core, a resin, either of the same composition or different composition which is compatible with the impregnant, but of higher solids content and viscosity is preferably applied to completely fill the voids in the fabric sock and provide in addition a thin plastic layer thereover.

The structure produced provides on the wood body a hard solid plastic outer shell in which the impregnant plastic has penetrated and is anchored in a labyrinth manner throughout the interstices or openings of the porous textures below the surface of the wood. On the surface of the wooden body, a fabric reinforcing member, e.g. a nylon woven sleeve is integrated in a plastic coating which is blended into the anchored impregnant. In a like manner, the protective fabric cover is applied to foam resin cores. I have found that when struck, a bowling pin reinforced in this manner is physically much more capable of absorbing blows. Pins formed in this manner in no way alter characteristics of the game. Scoring with these pins is consistently good through the pin life. The plastic impregnant not only anchors the resinous surface coatings to the core, but also it cements and reinforces the wood fibers. The reinforced coating securely anchored in the interstices serves to distribute the impact energy over a larger depth from the surface as well as spread it over a larger area than the immediate impact area. The effect is not unlike the foundation of a building, distributing load beyond the immediate surface. The result is that each unit volume of core (wood or plastic foam) and of plastic coating absorbs less impact energy. These two features, namely fabric reinforcement plus deep anchoring of the impregnant resin combine to give greatly superior service life and excellent scoring characteristics to the bowling pin throughout the life of the pin.

A critical feature of the invention resides in the embedding of the reinforcing fabric within the plastic coating which is anchored in the porous structure of the body. Prior attempts to adhere fabric material to bowling pin bodies by simply coating thereover have been unsuccessful in preventing separation or delamination of the fabric from the bowling pin body. Under the rigors of play, the prior art covers separate and are soon flaked off the pin body. Such a pin becomes logy in action.

It is an object of the present invention to provide a bowling pin of substantially increased durability and excellent scoring.

It is a further and more specific object of the present invention to provide a bowling pin comprising a reinforcing fabric cover embedded in a plastic composition which impregnates and is anchored in the interstices of the bowling pin body.

Additional objects and advantages will become apparent as the description of the invention progresses.

In order that the manner in which these and other objects are attained in accordance with the invention can be understood in detail, reference is made to the accompanying drawings which illustrate the method and product and wherein.

Figure 1:
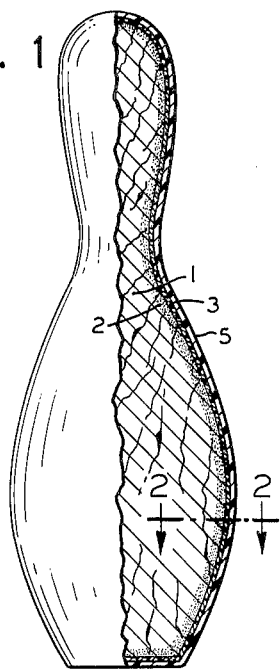
FIG. 1 is a view, partly in vertical elevation and partly in longitudinal section of a bowling pin having a wooden body produced in accordance with one embodiment of the invention in which impregnant resin has penetrated the wood interstices and has embedded the fabric cover placed over the wooden body. Conventional coatings are applied over the integrated fabric layer.
Figure 2:
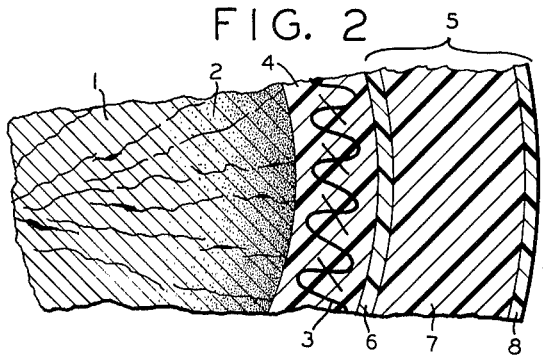
FIG. 2 is a fragmentary sectional view, enlarged in scale, taken on line 2—2, FIG. 1 and showing more distinctly the "graded" effect with depth of the primer impregnant in the wood and the embedding of the fabric reinforcing material in the resins.

In order that the method of the invention can be best understood, the general nature of the finished bowling pin will first be described with reference to FIGS. 1–4. FIG. 1 illustrates one form of pin which can be made in accordance with the invention and which comprises a pin body 1 of maple or other hardwood, the body being impregnated with a synthetic resinous material, as indicated at 2, to reinforce the wood and to provide a superior bond with the composite coating indicated at 5. The impregnant 2 as more clearly shown in FIG. 2 is graded that is, a gradually increased concentration of resin is deposited outwardly from the center of the wood core, which essentially is coated with a film of the impregnant and as a practical matter comprises part of the layer illustrated by the numeral 4. Embedded in the resin impregnant composition is the fabric 3, preferably a porous woven material such as nylon allowing the pin body to be impregnated through the fabric.

If desired the resinous composition 2 which penetrates the porous bowling pin base may be applied in varying consistency, i.e. to penetrate into the interstices in the pin body a lower solids content may be used and thereafter to embed and cover the fabric within the resin a composition 4, a higher solids content up to 100% solids, may be applied. Shown more clearly in FIG. 2, a conventional coating system 5 comprising a sealer coat 6, a relatively thick protective coat 7 and a topcoat to impart gloss and dirt repellency may be applied.

Figure 3:
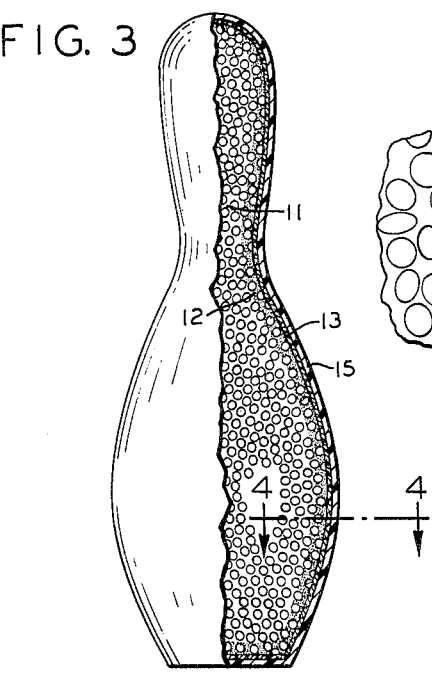
FIG. 3 is a view, similar to FIG. 1, illustrating a bowling pin in which a plastic foam core is utilized in place of wood; a single plastic layer of solid structure is applied over the integrated fabric layer.
Figure 4:
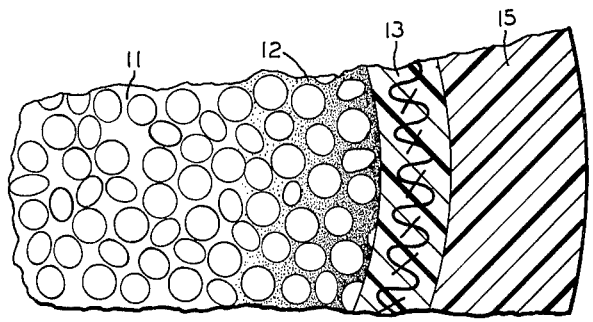
FIG. 4 is a fragmentary sectional view enlarged in scale taken on line 4—4 of FIG. 3 and showing in greater detail the impregnant in the core, the fabric embedded in plastic and the outer plastic layer.

Illustrated in FIG. 3, and more in detail in FIG. 4, is a plastic foam core 11 preformed to the contour of a bowling pin having substantial porosity and/or interstitial recesses into which the impregnant resin 12 penetrates. As discussed in conjunction with FIG. 2, a fabric 13 is applied over the pin body. The core is then impregnated with a solution of resin polymerizable in situ and the fabric sock is embedded in a plastic layer to form an integral resinous structure which is anchored in the pin body by way of the impregnant.

As seen in FIG. 4, the resinous composition impregnating the plastic foam core and the resin embedding the fabric are shown as distinct layers to facilitate a description. This layer which impregnates and coats the fabric may be of the same or different chemical composition, but should be of higher viscosity. Extending radially outward over the resin embedding the fabric a single additional resin layer is shown but it will be apparent that one or more resinous compositions may be used instead as illustrated in conjunction with FIG. 2.

An important advantage of the invention flows from the shaded or graduated density of the impregnant 2 and 12 in conjunction with the reinforcing fabric material 3 and 13 respectively, embedded in the resinous composition. This shaded property not only anchors the resin in the wood and prevents separation of the resin coating and the reinforcing fabric embedded therein from the wood base as occurs with coatings having a sharply defined or distinct separation between coatings, but also provides a cushioning structure to resist the severe blows on the pin by distributing the shock over a larger area of the pin body and coating. If desired, in applying subsequent coatings, such as the sealer coat 6, to the resinous layer containing the reinforcing fabric embedded therein, the sealer coat 6 may be applied before the polymerization or cure of the impregnant is substantially completed. In such procedures, a sealant composition containing a minor amount of the resin ingredient of the impregnant may be used if desired to promote this effect. The simultaneous cure of impregnant and sealant helps to produce an indistinguishable and inseparable bond between the coating resin layers, i.e. the impregnant and the sealer coats.

Referring again to FIG. 2, the composite coating 5 is described more in detail. Adjacent the impregnated surface of pin body 1 and the resinous layer 4 containing the embedded fabric 3, the coating 5 may comprise a conventional relatively thin, substantially vapor-impervious sealing film 6 which is bonded to the resinous layer 4 and to the wood of the pin body 1. If desired, the resin prime coat 4 may be partially swollen by the sealer coat solution composition, causing a substantial blending of the sealer coat into the fabric embedding layer 4. The sealer composition may effectively produce the swelling, or partial solution of the layer 4 with a suitable solvent may be employed for this purpose.

Continuously overlying the sealing coat 6, and uniformly bonded thereto may be applied a conventional relatively thicker protective gel coat 7. This protective coat is then preferably covered by a relatively thin, uniformly adhered dirt-repellent finish coat indicated at 8.

As will be apparent from FIGS. 2 and 4, the impregnating synthetic resin material extends for a substantial distance into the pin body. In the ball-impact area, it is advantageous to have the depth of the impregnation at least about 0.04 inch, and particularly good results are obtained if this depth in wood is from 0.10 inch to about 0.80 inch and even greater to about 1.5 inches in foamed plastic cores especially foams having an open cell structure. With foams substantially closed cell, the impregnant may be as low as 0.02 inch and up to about 1.2 inches. Using compression and vacuum techniques, impregnation of the wood body as high as about 1.2 inch and of the foamed plastic to about 2.0 inches may be obtained where this greater depth is desirable and is considered practical. Where the multicomponent coating system 5 is used, the sealing coat is generally of the order of 1–10 mils. Thicker films, of course, are not precluded. The subsequent protective coat 7 is of more substantial depth having a thickness of the order of 25–75 mils although thicknesses up to 250 mils may be employed. The finish topcoat 8 is of conventional thickness, preferably on the order of 2–12 mils but may be increased to as high as 40 mils or more where practical and desirable.

The embodiment contemplated in FIG. 4 shows a single plastic chemical composition which functions as both impregnant, filling the pore in the foam structure (low solids) and as coating layer (high solids) in which the fabric reinforcement is embedded. A single outer plastic layer 15 is applied over the fabric embedded layer. It will be apparent that the conventional three component coating system 5 described in conjunction with FIG. 2 may aso be applied over the fabric covered plastic foam pin of FIG. 4 in place of the single layer 15.

It is thus seen that the invention in essence resides in a unitary structure comprising (1) a resinous composition made to penetrate the pin body and anchor the coating therein and (2) a reinforcing fabric covering the pin body and being embedded in the resinous coating. The fabric embedding resin may or may not be of the same chemical composition as the impregnant resin. Preferably, it has a higher solids content. The invention is not limited by the application or composition of the "protective" or finish" coats discussed herein which are described primarily for the purpose of providing a fuller disclosure so as to permit a wider understanding and utilization of the inventive contribution.

The fabric material employed as reinforcement for the present invention includes a variety of textures of woven and knitted fabrics. The thickness of the fabric depends largely on the type and may vary for example from about 5 mils to about 120 mils prepared from yarn or filament thicknesses of about 2 to 20 mils. Fabrics having an unstretch weight of between about 0.02 and about 0.5 gram per square inch may be employed. Preferably a fabric of sufficient porosity is utilized because it permits initial mounting of fabric covered pins on racks readied for the complete coating procedure including impregnation through the fabric and application of embedding resin and protective topcoats on the racked pins without disruption of the process.

Included within suitable materials from which the fabric may be formed are nylon, rayon, cotton, polyethylene, polypropylene, sisal, acetate, various acrylics available under brand marks such as Creslan, Dynel and Orlon, polyester available as Dacron and the like. Nylon is particularly preferred because of its versatility, strength and excellent assimilation into the resin layer. Fabrics of continuous filament yarn as well as fabric prepared

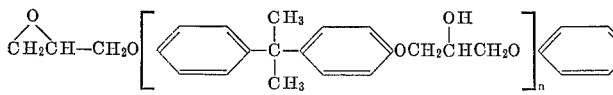 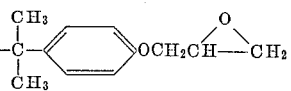

from spun staple yarn are contemplated. A softly twisted spun yarn construction which affords a fibrous surface with a large surface area resulting in a stronger interlocking effect (which to some extent resembles a branched structure) within the plastic layer is preferably utilized. A yarn with a crimp known as a Hellanca crimp is found to produce excellent results. The fabric may be suitably wrapped about the pin as a woven sheet but is preferably formed in a seamless cylindrical shape which is sealed at one end by procedures known in the textile art and woven or knitted so that when drawn over the pin body it conforms snugly to the bowling pin contour. With caprolactam nylon for example, a fabric having a thickness of from about 10 to about 40 mils is employed although this is not critical and varies with the material forming the fabric, the texture of the fabric and the results desired. The fabric cover as employed in the invention may be shrunk tight after placing over the pin by suitable treatment such as heat or steam treatment or it may be retained by elasticity of the fabric texture alone. A stretch nylon yarn makes this easily possible.

The polymerizable compositions used as impregnant are liquid materials which are polymerizable in situ in the interstices of the bowling pin body following impregnation thereof. They may contain various additives of the type conventionally utilized in the art to effect various results such as catalysts, curing agents, plasticizers, organic flexibilizing agents, and the like.

The term polymerizable as employed herein in referring to resinous compositions applied to the pin body is contemplated as inclusive of and generally used interchangeably, where applicable, with reactions described as condensation, curing, drying, polymerization, and molecular association, in referring to the chemical reactions resulting in extension of molecular size.

Compounds which may be employed as impregnant are the relatively non-viscous materials which may be penetrated into the wood core to a substantial degree. Viscosities of the polymerizable impregnant should preferably be below 500 centipoises although in the absence of vacuum or pressure impregnation, viscosities below about 100 centipoises are advantageous. Included are monomeric as well as partially polymerized compositions preferably those having a relatively low molecular weight.

Impregnant materials which may be employed include liquid formulations of resinous compositions characterized as thermosetting as well as thermoplastic. Suitable materials include polyester or alkyd resins; polyvinylidene chloride; acrylic resins e.g. methyl and butyl acrylates and methacrylates; acrylonitrile polymers and copolymers; polyurethane resins and epoxy resins. Particularly advantageous are the materials referred to as polyurethane resins and epoxy resins.

Polyurethane resins; are those prepared as recognized in the polymer art by the reaction of various diisocyanates e.g. tolylene diisocyanate, diphenylmethane-4,4'diisocyanate and hydroxyl rich materials; e.g. polyesters and polyglycols.

Any of the various compounds known as epoxy resins such as the compositions described in U.S. Patent No. 2,633,458 may be used including a solvent or non-solvent system. Epoxies are manufactured chiefly by the reaction of epichlorohydrin with bisphenol A. Epoxidized novolacs (condensate of phenol with an aldehyde) may also be used and are available commercially. Epoxy resins may also be manufactured by known processes employing peracetic acid. Generally the epoxides contemplated as impregnants are those of the general formula:

wherein $n$ has a value of from 0 to about 7. Those in which $n$ has a value greater than 7 have increasing viscosity and consequently a diminishing coefficient of impregnation. Expressed alternatively suitable epoxy resins are those which have been defined as polyesters containing a highly reactive epoxy or oxirane group at each terminal separated by an alternating aromatic and aliphatic system containing hydroxyl groups, are not included by air, have long storage life and cure hard. The epoxy resins are generally hardened or solidified by a variety of curing agents such as various amides, amines, acids, or by another resin for example. Curing agents and amount of this type are well known; see for example, columns 10 and 11 of U.S. Patent No. 2,872,427.

Examples of curing agents are such as: primary and secondary aliphatic amines, e.g. diethylenetriamine, ethylenediamine, triethylenetetramine, tetraethylenepentamine; hydroxyaliphatic amines, e.g. N-(hydroxyethyl)diethylenetriamine and N,N' - bis(hydroxyethyl)diethylenetriamine; polyalkylene polyamines; acrylonitrile-acrylamide copolymers; acrylonitrileamine adducts, e.g. cyanoethyldiethylenetriamine; aliphatic amine adduct, e.g. an adduct of liquid epoxy resins with an excess of polyamine such as the product of Shell Development Co. available as curing agent "u"; phenetic tertiary amines, e.g. tri-(dimethylaminomethyl)phenol; acid anhydrides, e.g. dodecylsuccinic anhydride and methyl "Nadic" anhydride in the presence of a tertiary amine catalyst such as benzyldimethylamine; boron trifluoride complexes, e.g. the complex formed by neutralizing $BF_3$ with an amine which provides a mixture which is stable for long periods of time at room temperature and will cure in 4–6 hours at about 110° C.

Reactive flexibilizing agents may be employed to eliminate brittleness in some epoxy-amine or epoxy-anhydride systems. In referring to flexibilizing agent for the impregnant or flexibilized impregnant, we mean that the impregnant after curing is in a state of increased toughness as distinguished from brittleness. The property of flexibilized resin is such that it has an impact resistance that prevents the wood substrate impregnated therewith from shattering under concussive forces. For this purpose, polysulfide rubbers in combination with an amine may be used. Various commercially available polyamide resins such as those containing amide groups in the polymer structure with or without one or more additional modifying groups such as, amino, cyano, and hydroxy units may be effectively used to function both as curing agent and as flexibilizing agent.

Partial curing as the term is applied herein is understood to mean causing the reaction to take place to such an extent that polymerization of the impregnant is still incomplete and that further interaction between the impregnant and subsequent applied sealer coat is possible. This is important since it results in a strong bond between the sealer coat and the impregnant. Total cure may then subsequently take place during the application and heating of subsequent coats and during the room-temperature "lay over" or storage period of pins prior to lane play.

The following examples in which the parts recited are parts by weight, are provided in order that the invention may be better understood. The examples are illustrative only and should not be interpreted as indicative of limitation on compounds or conditions stated.

The following general procedure is employed. The details relating to applying protective and finish coatings over the fabric embedding layer are presented only as an aid in providing a more complete description and not as a limitation of the invention presented.

Wood, including wood particle board cores, or foam cores of proper weight and dimensions are preferably first covered with the reinforcing fabric and then conveniently supported to facilitate handling such as by inserting dowels therein. The cores are then placed in racks and secured in place. The arrangement is such that preferably throughout the coating process the cores remain on these racks. These racks are preferably fed, in a continuous manner, through the primer-soak units in which the cores are impregnated with the primer solution. The impregnating period varies as desired or as necessitated by conditions or compositions used.

After the pin body has been impregnated and the reinforcing fabric is embedded in the plastic coating applied over the fabric covered cores, a conventional three component coating system of sealer, gel coat and top coat may be applied. A suitable coating system of nitrocellulose sealer ethyl cellulose protective gel coat and nitrocellulose lacquer is disclosed for example in U.S. Patent No. 2,804,399. With some resinous formulations, a single layer is sufficient. Where more than one coat of sealer is applied, each sealer coat is given an interim drying period. After proper drying, the sealed cores are readied for application of the gel protective lacquer. A dipping operation is preferably employed. At predetermined timed intervals, the sealed cores are dipped into protective gel-lacquer compositions preferably contained in heat-jacketed tanks and troughs. By a controlled withdrawal rate and by maintaining the gel-lacquer at a constant temperature and viscosity, a uniform coating of desired thickness is achieved. One or more dip applications may be employed. Drying is preferably conducted after each protective coating application. After this coating has dried sufficiently the final clear lacquer top coat is applied. The final drying is preferably conducted at moderate temperatures, e.g. from about 70°–150° F. and may vary from 15 minutes to 5 or 6 hours or more.

At this point, the coating operation is complete and the conventional finishing operations may be preformed on the coated pins: e.g. dowel removal, bottom undercutting for separate base insertion, striping, insignia or decal application, weighing, grading and the like.

Foam cores for use in accordance with the concept of the present invention may be prepared in the manner described in the pending application of G. A. Gruss, R. A. Smith and J. R. Infantino filed on May 23, 1960, Serial No. 31,161, and now U.S. Patent 3,147,975 and thereafter impregnated and reinforced as described in the present invention.

*Example 1*

A nylon "sock" (seamless construction, 28 mils thick) woven from continuous filament nylon is applied manually to a hard maple wood core by sealing the top of a fabric sleeve and securing the open end snugly within the base. The fabric covered core is then impregnated by soaking for 6 hours in solution (A) having the following composition:

| Ingredient: | Parts by weight |
| --- | --- |
| Polyether polyepoxide [1] | 10 |
| Polyamide resin [2] | 5 |
| Toluene | 43 |
| Isopropanol | 21 |
| Methylisobutyl ketone | 21 |

[1] Commercial available resin, Shell Chemical Corp.
[2] Acrylic polymer commercially available; molecular weight about 10,000 containing about 20–30 mole percent amine units; about 20–50 mole percent amide units and about 30–50 mole percent nitrile units.

which is diluted with toluene, isopropanol, and methyl isobutyl ketone to a viscosity below 100 cps. The impregnated pin is then air dried for 12 hrs. The cure of the resin is approximately 60–80% complete.

Next the fabric covered impregnated core is flow coated so as to more fully embed the fabric with a more viscous resinous composition (B) of the following formulation:

| | Parts |
| --- | --- |
| Epoxy resin (Shell Chemical Corp.) having an epoxide equivalent of 175–210 | 80 |
| Epoxylated cashew nut shell liquid, flexibilizer (Minnesota Mining & Manufacturing Co.) | 20 |
| Curing agent, polyglycoldiamine (Union Carbide Chemicals Co.) | 33 |

This material is used as shown as a wholly reactive material for maximum coating application but it may also be diluted with 50/50 toluene-methyl isobutyl ketone if necessary to facilitate application. Coating is applied in one or several applications to achieve a total layer of 40–120 mils. A room temperature cure of the coating for 1 hr. and 4 hrs. at 150° F. effecting a 60–85% cure is employed. If desired, the coating is applied at 10–40 mils thickness and partially cured at room temperature for 1–2 hours. Where white color is desired ½% $TiO_2$ pigment is dispersed in the epoxy before mixing. This epoxy resin layer is followed by the application of one or more coats of a conventional coating compositions, e.g. one comprising an ethyl cellulose gel coat and a nitrocellulose top coat. A system of this type is disclosed for example in U.S. Patent No. 2,804,399.

In the foregoing, a flow coating procedure was employed to apply the fabric embedding plastic composition, but it will be apparent that other procedures such as dip, spray, or casting techniques known to the art may also be suitably used in coating. Following the embedding of the fabric a conventional sealer coat approximately 1 to 1.5 mils thick comprising nitrocellulose lacquer 30 sec. viscosity is applied in three coats over the epoxy impregnated fabric covered pin by flow-coating and drying for ½ hour at 150° F. after each coat is applied. In addition to drying of the sealer, further cure of the primer impregnant layer occurs. The resulting sealing coat was approximately 4 mils in thickness and was uniform, fluid-impervious and extended continuously over the entire pin body. The sealing coat was uniformly and tenaciously bonded to the fabric and epoxy resin impregnant at the surface of the pin body.

A protective coat of commercially available ethyl-cellulose gel-lacquer containing epoxy-polyamide resin, 10% based on weight of ethylcellulose, and a minor amount of a solvent mixture comprising toluene, ethyl acetate, and ethanol to promote fluidity was then applied to each bowling pin body by dipping the same three times in the gel-lacquer composition to give a protective coat about 40–45 mils. In this operation the pins were initially at room temperature and the gel-lacquer composition was maintained at 200° F. After each of the first two dips, the bowling pin bodies were dried for 1 hour at 120° F. After the third dip, they were dried for an additional 2 hours at 150 F. The finish protective coat was completely uniform and free from any imperfections normally encountered because of escape of gases from within the pin body.

The bowling pins were then completed by applying a nitrocellulose top coat applied by flow-coating procedure and then air-dried at room temperature for 30 minutes. A top coat of 2–4 mils thickness is applied although a coating up to 15 mils by multiple applications may be suitably applied where desirable. Upon aging for about two weeks all resin layers are cured substantially complete.

Randomly selected, samples of the bowling pins made according to Example 1 were tested on a laboratory impact testing apparatus until the pins had been subjected to a number of blows on the impact tester representing games of actual rough bowling alley service, approximately double that of commercially available plastic coated pins. The test was then discontinued. The pins were free of cracks in the composite coating, had excellent surface appearance. Scoring is excellent and constant throughout the life of the pin. Sonic characteristic is substantially the same as a plastic coated wood pin. The pins exhibited no loss of coating material and showed no appreciable change in ball-line diameter.

*Example 2*

A hard maple wood core covered with a nylon sleeve is impregnated as previously described in Example 1. The fabric embedding coating is applied by flow-coat technique using the following formulation:

| | Parts |
|---|---|
| Isocyanate elastomer, E. I. du Pont de Nemours Co., Inc. | 100 |
| 4,4', methylene bis(2-chloroniline) | 25–29 |

Cured 2 hours at 175° F.
Coating is initiated at 210° F.±5° F.

This coating is applied at 40–120 mils by itself in one series of runs and then in a subsequent series at 10–40 mils thickness and further coated with ethylcellulose lacquer to a total of 40–120 mils.

The formulation is readily pigmented. The range of $TiO_2$ employed by blending into the formulation preferably varies between ¼% to 2%. The subsequent topcoats are applied as described in Example 1. The bowling pins have durability comparable to twice the life of commercial plastic coated pins.

*Example 3*

A hard maple wood core is covered with a caprolactam nylon knit seamless sock 35 mils thick and impregnated and dried as in Example 1. Next the impregnated fabric-covered core is flow coated with the following fabric embedding composition:

| | Parts |
|---|---|
| Epoxy resin having an epoxide equivalent of 525 (Shell Chemical Corp.) | 100 |
| Polysulfide (Thiokol Chemical Corp.) | 50 |
| Triethylenetetramine | 10 |

After curing for 3 hours at 80° F., the conventional three coat system of sealer, gel coat, and topcoat described in Example 1 is applied. The test results provide data indicative of a useful pin life exceeding twice that of commercially available plastic coated pins. The rebound and sonic characteristics are excellent.

*Example 4*

Maple wood bowling pin cores are impregnated for two days in a polyvinyl acetate latex and dried at 120–140° F. for 6 hours. A woven nylon sock of seamless construction, 10 mils thicks having a weight of 0.03 gm./in.$^2$, is then drawn tightly over these primed cores.

The sock and core are then flow coated with the epoxy resin solution (B) of Example 1. The fabric embedded coated pins are subsequently coated with the conventional coatings described in Example 1. The test data clearly demonstrates the superiority of the pins produced over commercially available plastic coated pins.

*Example 5*

Six cores of rigid polyurethane foam or cellular structure are prepared in the manner described in the pending application of G. A. Gruss, R. A. Smith and J. R. Infantino, Serial No. 31,161, filed on May 23, 1960 by casting the following formulation into a mold of suitable dimensions:

100 parts of unsaturated polyester (Pittsburgh Plate Glass Co.—Selectrofoam)
1 part of emulsifier and
1 part of N-methyl morpholine as catalyst thoroughly mixed is blended with 58.5 parts of toluene diisocyanate (National Aniline Co., Nacconate 80) for 60 seconds and poured into the mold. The mold contents are cured at 175° F. for one hour. A foam core having a density of 35.5 pounds per cubic foot is obtained having a texture containing about 10%–15% open cell structure. A woven rayon sleeve 12 mils thick weighing approximately 0.025 gram per square inch is pulled tightly over the core and secured at the base.

The fabric covered foam core is then impregnated and the fabric embedded in the manner and using the compositions described in coating the pins of Example 1. The pins exceed plastic coated wood pins by at least 50% and have excellent rebound and acceptable sonic quality.

*Example 6*

The procedure of Example 5 is repeated in forming the rigid plastic foam cores. A fabric covering sock of cotton-nylon blend 60% to 40% respectively is pulled snugly over the foamed pin cores. The core is then impregnated and the sock embedded employing the epoxy resin formulations of Example 3. The resin embedded sock covered pins are then introduced base up into a suitable mold, properly shimmed with spacers therein and liquid resin of the formulation comprising

| | Parts |
|---|---|
| Epoxy resin | 100 |
| Polysulfide | 50 |
| Triethylenetetramine | 10 | is fed under pressure into an opening at the bottom until the liquid resin flows out of an opening at the top of the mold. The pins are retained overnight in the mold at room temperature to cure. Cure in the mold may also be effected at about 150° F. to 175° F. for 1½ to 3 hours. This molded outer layer used in lieu of the conventional 3-coat system is approximately 60 mils thick. The pins exhibited excellent properties. Tests indicate a useful life in excess of twice that found with commercially available plastic coated pins, good scoring and sonic quality and freedom from cracks in the surface coating.

*Example 7*

The procedure of Example 6 is repeated using as the foamable formulation the following:

| | Parts |
|---|---|
| (Polyol Niax Triol 2K–380 (Carbide Chemicals Co.) | 100 |
| (Emulsifier) Tween 40 polyoxyethylene sorbitan monopalmitate | 1.0 |
| (Catalyst) N-methyl morpholine | 0.1 |
| (Toluene diisocyanate) Naccanate 80 (National Aniline Co.) | 60 |

The outer plastic layer to the resin embed sock covered pins instead of applying in a mold, is applied by 10 successive flow coats of the epoxy resin-polysulfide-triethylenetetramine formulation to produce a 55 mil outer shell. A 15 minute dry period at 110° F. is used between each coat. The characteristics of the pins are comparable to those produced in Example 6.

*Example 8*

The procedure of Example 1 is repeated with the exception that a seamless knitted nylon sleeve 6 inches wide is placed substantially over the center of the ball line of the pin held in place and is steam shrunk until it adheres tightly forming a band around the ball line of the bowling pin body. The pins are impregnated as described in claim 1 but the impregnant is left uncured before adding the following resin formulation to embed the sleeve.

| | Parts |
|---|---|
| Epoxy (Epon 828, Shell Chemical Co.) | 80 |
| Flexibilizer (Cardolite, Minnesota Mining & Manufacturing Co.) | 20 |
| Curing agent, polyglycolamine (Carbide Chemicals Co.) | 33 |

This material is used full strength as shown for maximum coating application but it may be diluted with 50/50 toluene/methyl isobutyl ketone if necessary to facilitate application. Coating is applied in one or several applications to achieve a total of 40–120 mils; (and room temperature cured for 1 hour+4 hours at 150° F.). If desired, the coating is applied at 10–40 mils thickness and partially cured at room temperature for 1–2 hours followed by the application of 30 to 80 mils of ethyl-cellulose by several dips in the following formulation:

| | Parts |
|---|---|
| Ethylcellulose 100 cps., medium ethoxy (Dow Chemical Co.) | 15–24 |
| Plasticizer Paraplex RG–2 (Rohn & Haas) | 0.4–0.7 |
| Titanium Dioxide pigment (pre-ground with plasticizer) | 0.4–0.7 |
| Solvent system (comprising the following: xylene 70%, aliphatic naphtha 10% and butanol 20%) | 84.2–74.6 |

The above formulation is used at temperatures of 180–210° F.

The service life of the pins is excellent. Diameter shinkage at the ball line is less than 30% of that of commercial plastic coated pins.

*Examples 9, 10 and 11*

The procedure of Example 1 is repeated with the exception that in place of the impregnant formulation (A) an impregnant comprising (9) polyvinyl acetate, (10) polyvinyl acetal and (11) polyvinyl butyral are used as impregnants for the wooden cores. The acetal and butyral are obtained by known means e.g. the reaction of the acetate with methanol and hydrolyzed; the hydrolysis product is then reacted with an aldehyde in the presence of heat and sulfuric acid to produce the acetal structure. The fabric is subsequently embedded in formulation (B) as described in Example 1 and the conventional 3-coat system applied. Each of the pins has superior properties over commercially available plastic coated pins.

I claim:

1. The method of making a bowling pin having a body encased in a plastic protective cover comprising preforming a wood bowling pin body, applying to the pin body a fabric envelope having the property of elastically conforming to the contour of said preformed body when drawn taut and impregnating said fabric and penetrating the surface of said body a substantial distance with a liquid synthetic epoxy resin which has a consistency capable of permeating said body surface and is polymerizable in situ, partially curing said liquid synthetic epoxy resin and then completing the polymerizing said resin thereby converting said resin to a solid composition integrally anchored to said body and containing said woven fabric as an integral component of the plastic cover.

2. The method of making a bowling pin having a body encased in a plastic protective cover comprising preforming a wood bowling pin body, applying to the pin body a fabric envelope having the property of elasticity conforming to the contour of said preformed body when drawn taut and impregnating said fabric and penetrating the surface of said body with a liquid epoxy resin which has a consistency capable of permeating said body and is polymerizable in situ, at least partially polymerizing said epoxy resin and thereby converting said resin to a solid composition with the woven fabric embedded in said partially polymerized epoxy resin as an integral part of said pin body, applying to said coated bowling pin body a vapor impervious resinous film and drying the same to provide a sealing coat uniformly and tenaciously bonded to the solidified epoxy impregnating resin.

3. The method of claim 2 wherein said vapor impervious resinous film comprises a nitrocellulose base, and then completing the curing of said partially polymerized epoxy resin.

4. The method of claim 2 wherein said fabric is nylon, said liquid epoxy resin is only partially polymerized prior to application of said vapor impervious film and wherein said vapor impervious film comprises a nitrocelluluose base, and complete polymerization of the epoxy impregnant is effected after the application to the pin of said vapor impervious film.

5. The method of making a bowling pin having a body encased in a plastic protective covering comprising preforming a wood bowling pin body, applying to the pin body a fabric envelope having the property of elasticity conforming to the contour of said preformed body when drawn taut and impregnating said fabric penetrating the surface of said body with a liquid epoxy resin composition which has a consistency capable of permeating said body a substantial depth and is curable in situ, partially polymerizing said composition and thereby converting it to solid form anchored in penetrating relationship with said body and with the woven fabric embedded in said partially polymerized epoxy resin, as an integral part of said pin body, thereafter applying to said bowling pin body a vapor impervious coating comprising a resinous lacquer and drying the same to provide a sealing coat uniformly and tenaciously bonded to said partially polymerized epoxy resin, and subsequently applying and curing thereon a synthetic resinous protective coat and a dirt-repellent synthetic resin topcoat.

References Cited by the Examiner

UNITED STATES PATENTS

| | | | |
|---|---|---|---|
| 2,535,033 | 12/1950 | Bergere | 273—82 |
| 2,591,768 | 4/1952 | Austin | 117—72 |
| 2,610,057 | 9/1952 | Hunt | 273—82 |
| 2,656,294 | 10/1953 | Hunt | 154—121 |
| 2,813,818 | 11/1957 | Pearson | 154—110 |
| 2,944,821 | 7/1960 | Mason | 273—82 |
| 3,015,132 | 1/1962 | Bunting | 18—48 |
| 3,024,819 | 3/1962 | Dosker | 144—320 |
| 3,025,062 | 3/1962 | Duffin | 273—82 |
| 3,135,639 | 6/1964 | Bilodeau | 273—82 |

EARL M. BERGERT, *Primary Examiner.*

LEONARD W. VARNER, JR., *Examiner.*